(12) United States Patent
Hamilton et al.

(10) Patent No.: US 8,396,120 B2
(45) Date of Patent: Mar. 12, 2013

(54) ROBUST SINGLE-PASS VARIABLE BIT RATE ENCODING

(75) Inventors: Eric Hamilton, Los Gatos, CA (US); Jian Lu, Sunnyvale, CA (US); Gregory K. Wallace, Palo Alto, CA (US); Peter Chou, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 291 days.

(21) Appl. No.: 12/784,203

(22) Filed: May 20, 2010

(65) Prior Publication Data

US 2010/0226430 A1 Sep. 9, 2010

Related U.S. Application Data

(63) Continuation of application No. 10/811,427, filed on Mar. 26, 2004, now Pat. No. 7,746,927.

(51) Int. Cl.
*H04N 7/18* (2006.01)

(52) U.S. Cl. .......... 375/240.03; 375/240.04; 375/240.05

(58) Field of Classification Search . 375/240.01–240.29
See application file for complete search history.

(56) References Cited

U.S. PATENT DOCUMENTS 7,366,240 B2 * 4/2008 Chiang Wei Yin et al. .......... 375/240.26

* cited by examiner

*Primary Examiner* — Andy Rao
(74) *Attorney, Agent, or Firm* — Kenyon & Kenyon LLP

(57) ABSTRACT

An encoding manager facilitates robust single-pass variable bit rate video encoding of a video sequence. Before encoding the video sequence, the encoding manager determines the size of a buffer to use for keeping track of over/under used bits generated during encoding. The encoding manager uses the target bit rate for the video sequence and the length of the video sequence to determine the size of the buffer. After allocating bits to a frame of the sequence, the encoding manager determines the quant to use to encode that frame. The determination of a quant to use to encode a frame is informed by the fullness of the buffer. The encoding manager adjusts the quant to use (and thus the aggressiveness of its encoding) in response to the amount of overflow generated thus far by the encoding of the video sequence.

24 Claims, 2 Drawing Sheets

ROBUST SINGLE-PASS VARIABLE BIT RATE ENCODING

CROSS-REFERENCE TO RELATED APPLICATIONS

The present application is a continuation of U.S. patent application Ser. No. 10/811,427, filed on Mar. 26, 2004, entitled "Robust Single-Pass Variable Bit Rate Encoding", which is incorporated herein by reference. This application is related to the patent application entitled "Robust Multi-pass Variable Bit Rate Encoding," filed on Dec. 30, 2003, now bearing Ser. No. 10/751,345 and having the same assignee ("The Multi-pass Application"). The Multi-pass Application is herein incorporated by reference in its entirety.

BACKGROUND

1. Field of Invention

The present invention relates generally to video encoding, and more specifically to single-pass variable bit rate encoding.

2. Background of Invention

Encoded digital video, such as video encoded according to the Moving Picture Expert's Group Version 2 ("MPEG2") standard and stored on a Digital Video Disk ("DVD"), is commercially very popular today. Contemporary video encoders are expected to produce high quality results, and to offer a wide variety of user controls, such as variable bit rate encoding. In single-pass variable bit rate encoding, an encoder makes a single pass through a video sequence, dynamically setting optimized bit rates for the frames thereof.

Because the bit rate for video encoded on a DVD or similar medium can vary per frame, it is desirable to utilize variable bit rate encoding to maximize the output quality, as the number of bits needed to encode a frame of a video sequence varies based on content and other factors. With fixed sized media, it is required to store an entire data image (e.g., a video sequence describing a film) in a fixed space (e.g., one side of a DVD). By varying the bit rate per frame such that individual frames are encoded at optimal bit rates, an attempt is made to maintain roughly constant quality throughout the video sequence.

In some variable bit rate encoding techniques, the encoder makes multiple passes through the video sequence. Because the bit rate of different frames will vary as a function of frame complexity, the encoder can build a frame complexity profile during the first-pass, and then encode the sequence according to the complexity profile during a second-pass.

However, it is also desirable to be able to encode a video sequence according to a variable bit rate in a single pass. Unlike multi-pass variable bit rate encoding, single-pass variable bit rate encoding can be used in real time. Single-pass variable bit rate encoding can also be used during the first pass of multi-pass variable bit rate encoding, in order to attempt to determine an optimal target bit rate. Additionally, single-pass variable bit rate encoding is faster than multi-pass variable bit rate encoding.

Single-pass variable bit rate encoding is known, but requires a trade off between encoding a video sequence at a target average bit rate (e.g., encoding a video sequence to fit on one side of a DVD) and the quality of the encoded video sequence. Single-pass variable bit rate encoding as it exists in the prior art reduces the bit rate of complex frames by lowering the quality of those frames as needed to hit a target average rate. Unfortunately, this results in inconsistent quality across the video sequence as a whole, because more complex frames are encoded for lower quality than that of less complex frames.

What is needed are robust single-pass variable bit encoding methods, systems and computer program products that allow encoding of a video sequence at a target average bit rate while still maintaining a substantially consistent quality across the video sequence as a whole.

SUMMARY OF INVENTION

An encoding manager facilitates robust single-pass variable bit rate video encoding of a video sequence. Before encoding the video sequence, the encoding manager determines the size of a buffer to use for keeping track of overused and/or underused bits generated during the encoding process. The encoding manager uses the target bit rate for the video sequence and the length of the video sequence to determine the size of the buffer. Thus, the buffer size will vary according to the length of the video sequence being encoded, as well as the target bit rate for encoding the sequence.

After allocating bits to a frame, the encoding manager determines the quantizer value ("quant") to use to encode that frame. The determination of a quant to use to encode a frame is informed by the fullness of the buffer. The encoding manager adjusts the quant to use (and thus the aggressiveness of its encoding) in response to the amount of underused or overused bits generated thus far by the encoding of the video sequence.

In some embodiments, the video sequence is encoded as GOPs (Group of Pictures) that consist of I-, P-, and B-frames, and the buffer is divided into separate segments to hold overused or underused bits for I frames, P frames and B frames. In such embodiments, if any segment is beyond full (overflow) or empty (underflow), the overflow or underflow bits are stored in a counter that will be added to the segment of the next frame type to be encoded, to the extent that that segment is not overflowed or underflowed itself Any bits that cannot be added to the segment are retained in the counter. Through this mechanism, overflow or underflow is distributed between frame types within a GOP to the extent possible.

The features and advantages described in this summary and the following detailed description are not all-inclusive, and particularly, many additional features and advantages will be apparent to one of ordinary skill in the art in view of the drawings, specification, and claims hereof Moreover, it should be noted that the language used in the specification has been principally selected for readability and instructional purposes, and may not have been selected to delineate or circumscribe the inventive subject matter, resort to the claims being necessary to determine such inventive subject matter.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
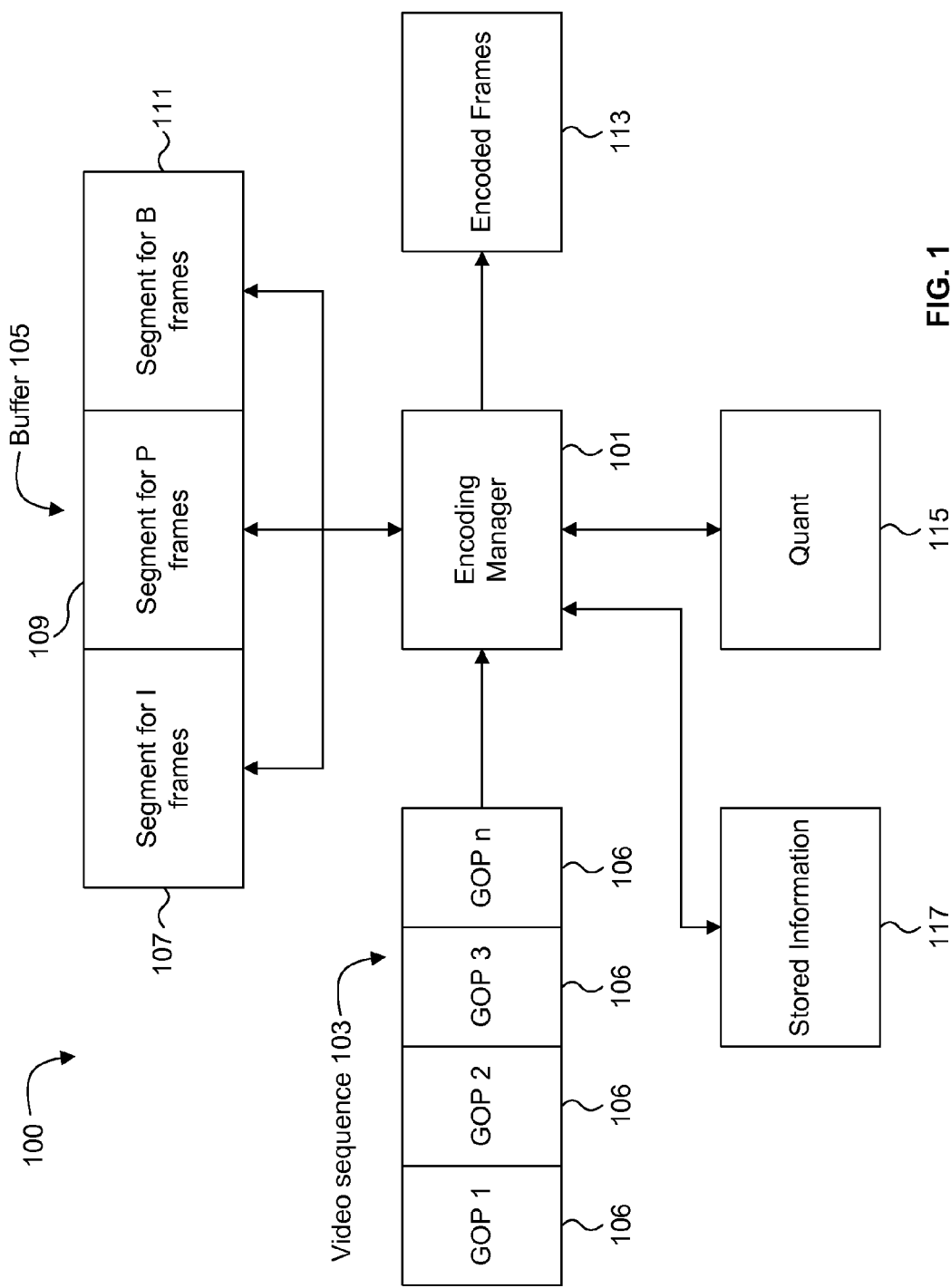
FIG. 1 is a block diagram, illustrating a high level overview of a system for encoding a video sequence, according to some embodiments of the present invention.

FIG. 1 illustrates a high level overview of a system 100 for performing some embodiments of the present invention. As illustrated in FIG. 1, an encoding manager 101 encodes a video sequence 103. It is to be understood that although the encoding manager 101 is illustrated as a single entity, as the term is used herein an encoding manager 101 refers to a collection of functionalities which can be implemented as software, hardware, firmware or any combination of the three. Where an encoding manager 101 is implemented as software, it can be implemented as a standalone program, but can also be implemented in other ways, for example as part of a larger program, as a plurality of separate programs, or as one or more statically or dynamically linked libraries.

Before encoding the video sequence 103, the encoding manager 101 determines the size of a buffer 105 to use for keeping track of overused and/or underused bits generated during the encoding process. The encoding manager 101 uses the target bit rate for the video sequence 103 and the length of the video sequence 103 to determine the size of the buffer 105. Thus, the buffer 105 size will vary according to the length of the video sequence 103 being encoded, as well as the target bit rate for encoding the sequence 103. Typically, although not necessarily, the encoding manager adjusts the size of the buffer 105 according to an error bound, the specific value of which is a design parameter. For example, in one embodiment the encoding manager 101 determines the buffer 105 size according to the formula:

Buffer Size=(Bit Rate*Number Frames/Frame Rate)
*Error Bound

The specific value to use for the error bound is a function of how much deviation from the target bit rate is considered acceptable.

In some embodiments, the encoding manager 101 breaks a video sequence 103 into GOPs 106 (group of pictures) that consist of I-, P-, and B-frames, and encodes each and every GOP as an independent entity, as illustrated in FIG. 1. In such embodiments, the encoding manager 101 allocates a segment 107 of the buffer for keeping track of over/underused bits for I frames, a segment 109 for keeping track of over/underused bits for P frames and a segment 111 for keeping track of over/underused bits for B frames. In order to determine the respective sizes of the segments, the encoding manager 101 determines the number of each type of frame per GOP 106, based on the nominal GOP 106 pattern. The encoding manager 101 can then use this information to calculate a normalization factor expressing a ratio between the frame types within a GOP 106, and use the normalization factor in determining the buffer 105 segment sizes. For example, in one embodiment the encoding manager 101 determines the normalization factor according to the formula:

$NF=3*(NI+NP+NB)$ wherein NF is the normalization factor, and NI, NP and NB are the number of I, P and B frames 113 per GOP 106 respectively. Of course, NI will always be equal to one, as a GOP 106 by definition has a single I frame.

The encoding manager 101 can then use the normalization factor to calculate the size of each buffer 105 segment, for example by using the formulas:

$I$ Segment Size=3*Buffer Size/$(NF*0.8)$ $P$ Segment Size=3*Buffer Size*$NP/(NF*0.8)$ $B$ Segment Size=Buffer Size*$NB/(NF*0.8)$ Of course, the specific formulas given above are examples. Other formulas are used in other embodiments, depending upon the amount of the total buffer 105 size desired for the segments corresponding to the respective frame types. Other examples will be readily apparent to those of ordinary skill in the art in light of this specification.

In some embodiments, the buffer 105 and its segments are virtual, in the sense that they are not instantiated as blocks of memory holding the actual over or underused bits generated during the encoding process, but instead simply keep track of the numbers of said bits, and the corresponding fullness resulting therefrom. In these embodiments the buffer 105 and its segments are said to have a size in the sense that they keep track of the number of over/underused bits, and how full a physical buffer 105 or segment of the determined size would be (e.g., fifty percent full, seventy percent full) if it were holding that number of bits. This fullness is then used by the encoding manager 101 to determine how aggressive to be in compressing and encoding frames 113 of the video sequence 103 (in other words, what quant 115 to use), as explained in detail below. Before encoding any frames 113 of the video sequence 101, the encoding manager 101 initializes each segment of the buffer 105 to a default initial fullness (e.g., half full) so that the encoding manager 101 will not initially be overly or underly aggressive in the encoding of frames 113. The specific default initial fullness to use is a design parameter.

In various embodiments of the present invention, the encoding manager 101 also initializes other parameters before encoding the video sequence 103. In some embodiments, the encoding manager 101 initializes a base quant envelope for each frame type to default initial values. The base quant envelope for a frame type is a normalized running average of the quants 115 used to encode frames 113 of that type. The base quant envelope for each frame type can be used to control variation in the quant 115 to use to encode specific frames 113 of that type, as explained in detail below. The exact values to which to initialize the base quant envelopes is a design parameter. For example, the base quant envelopes could be initialized according to the following formulas:

$I$ Envelope=$IFRAME\_BASE\_MQ$=32000000/Bit Rate $P$ Envelope=$PFRAME\_BASE\_MQ$=32000000/Bit Rate $B$ Envelope=$BFRAME\_BASE\_MQ$=85000000/Bit Rate wherein the constants used in calculating IFRAME_BASE_MQ and PFRAME_BASE_MQ are examples. Of course, other base value can be used as desired.

The encoding manager 101 can also initialize a base quant envelope control for each frame type, which is a control used to gate the fluctuation of base quant envelope values, as explained in detail below. The exact values to which to initialize the base quant envelope controls is a design parameter. For example, the base quant envelope controls could be initialized according to the following formulas:

Envelope Control
$I$=RATE_CONTROL_PARAMETER*$(NI+NP+NB)$

Envelope Control
$$P = \text{RATE\_CONTROL\_PARAMETER} * (NI+NP+NB)/NP$$

Envelope Control
$$B = \text{RATE\_CONTROL\_PARAMETER} * (NI+NP+NP)/NB$$

wherein RATE_CONTROL_PARAMETER is equal to (for example) 0.03, and NI, NP and NB are the number of I, P and B frames per GOP 106 respectively. Of course, other control values can be used as desired.

As illustrated in FIG. 1, in some embodiments, the encoding manager 101 stores information 117 concerning at least some encoded frames 113 by frame type, and uses the stored information 117 in determining quants 115 with which to encode frames 113 of that type. In some embodiments, the stored information 117 is in the form of the number of over or underused bits generated by the encoding of a specific number of most recently encoded I frames 113, P frames 113 and B frames 113. This can be stored for example in three arrays (one for each frame type) each having the number of elements equal to the number of most recently encoded frames 113 about which to store information 117. Of course, other storage formats are possible and will be readily apparent to those of ordinary skill in the relevant art in light of this specification. The use of the stored information 117 in the determination of quants 115 to use for encoding is explained in detail below. The number of frames 113 about which to store information 117 is a design parameter. In embodiments in which such information 117 is stored, before encoding the video sequence 103 the encoding manager initializes the storage data structure(s) (e.g., the arrays) to a value indicating that no substantive information 117 has been stored yet (e.g., NULL).

The encoding manager 101 can also initialize other parameters before encoding the video sequence, for example ratio information concerning frame types, and a frame complexity parameter for each frame type. The use of these parameters is explained below.

Figure 2:
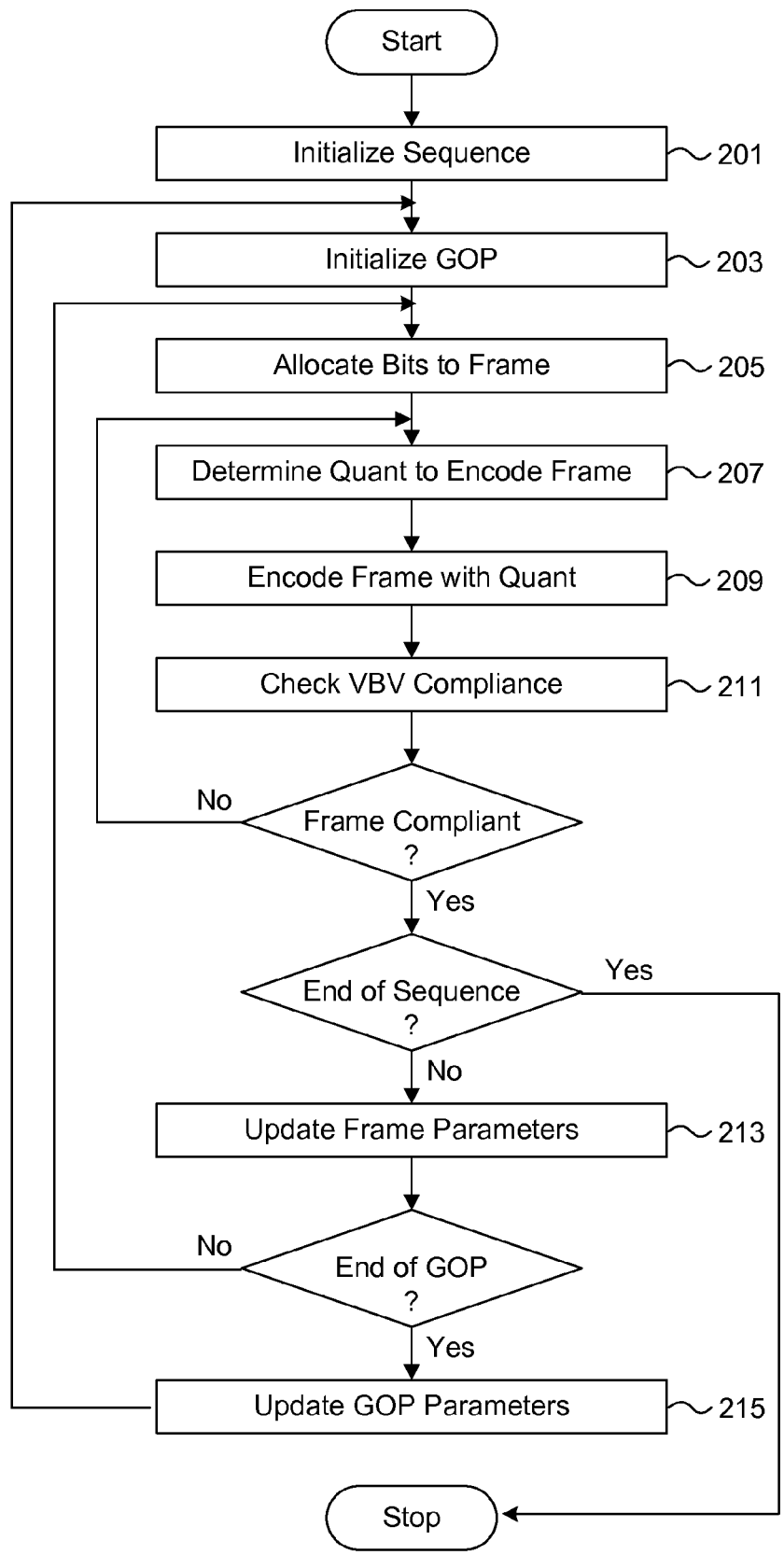
FIG. 2 is a flowchart, illustrating steps for an encoding manager to encode a video sequence according to some embodiments of the present invention.

Turning now to FIG. 2, steps are illustrated for the encoding manager 101 to encode a video sequence 103 according to some embodiments of the present invention. First, the encoding manager 101 initializes 201 the buffer 105, its segments 107, 109, 111 and parameters for encoding the video sequence 103, as described above. Next, the encoding manager initializes 203 GOP parameters to encode the frames 113 of a GOP 106. Specifically, in some embodiments the encoding manager 101 calculates a GOP bit target for the GOP 106 to be encoded, the GOP bit target being a function of, for example, the number of I frames, P frames and B frames per GOP 106, the target bit rate for the video sequence 103 and any bits carried over from a last encoded GOP 106. For example, the GOP bit target could be calculated according to the following formula:

$$\text{GOP Bit Target} = (NI+NP+NB) * \text{Bit Rate/Frame Rate} + R$$

wherein NI, NP and NB are the number of I, P and B frames per GOP 106 respectively, and R is equal to the number of remaining bits carried over from last GOP 106 (R will initially equal 0 for the encoding of the first GOP 106). The GOP bit target is used in the allocation of bits to a frame to be encoded, as explained in detail below.

During the GOP 106 initialization, the encoding manager 101 can also check the fullness for each segment of the buffer, and initialize each segment to a specified minimum fullness (e.g., 20%) if that segment has fallen below a floor value (e.g., 0). Of course, the specific minimum fullness and floor values to use are design parameters. Additionally, the encoding manager can initialize a counter of unallocated over/underflow bits for the GOP 106 to 0. The use of this counter will be explained below.

After initializing 203 a GOP 106, the encoding manager 101 allocates 205 a specific numbers of bits to the first frame 113 of that GOP 106. In some embodiments of the present invention, the encoding manager 101 allocates 205 bits to individual frames 113 of the video sequence 103 according to the TM5 reference model, the implementation mechanics of which are known to those of ordinary skill in the relevant art. In other embodiments, a modified TM5 reference model is used, in which the allocation is informed by parameters such as frame complexity parameters for the last encoded frame 113 of the type being encoded, the GOP bit target for the GOP 106 being processed, ratio information concerning frame types within a GOP 106 and the number of different frames 113 of each type per GOP 106. For example, the encoding manager 101 can use the model:

$$X_{frame\ type} = (\text{Total Bits} - \text{Overhead Bits}) * \text{quant}$$

wherein $X_{frame\ type}$ equals the complexity of the last encoded frame 113 of the type being encoded. Recall that these complexity parameters are initially set to default values, and will be updated after frames 113 are encoded by plugging the total bits, overhead bits and used quant 115 for the actual encoded frame 113 into the model, as described below. Using $X_{frame\ type}$, the encoding manager 101 can determine the number of bits to allocate to the current frame 113, for example by using the following formulas for the different frame types:

$$\text{Bits for } I \text{ Frame} = G/(NI+(NP*XP)/(XI*KP)+(NB*XB)/(XI*KB))$$

$$\text{Bits for } P \text{ Frame} = G/(NP+(KP*NB*XB)/(KB*XP))$$

$$\text{Bits for } B \text{ Frame} = (G - \text{Bits for } I \text{ Frame} - \text{Bits for } P \text{ Frame} * NP)/NB$$

wherein G equals the GOP bit target, XI, XP and XB equal the complexity of the last encoded I, P and B frames 113 respectively, NI, NP and NB equal the number of I, P and B frames per GOP 106 respectively and KP and KB are ratio information concerning frame types, which can be initialized to default values before encoding any frame 113 of the video sequence 103, as described above (e.g., KP can be initialized to 2 and KB can be initialized to 5), and later updated after encoding each frame, as described below.

After allocating 205 bits to a frame 113, the encoding manager 101 determines 207 the quant 115 to use to encode that frame 113. As mentioned above, the determination of a quant 115 to use to encode a frame 113 is informed by the fullness of the buffer 105 (or more specifically in GOP 106 processing embodiments, the fullness of the corresponding segment of the buffer 105). The encoding manager 101 adjusts the quant 115 to use (and thus the aggressiveness of its compression) in response to the amount of underused or overused bits generated thus far by the encoding of the video sequence 103. As will be apparent to those of ordinary skill in the relevant art, there are a variety of possible methodologies that can be used to determine the quant 115 as a function of the fullness of the buffer 105, all of which are within the scope of the present invention.

In one embodiment, the quant 113 is determined by first adding the counter of unallocated over/underflow bits for the GOP 106 (initially set to 0 as explained above) to the buffer 105 segment for the frame type to be encoded with the quant 115, to the extent that the segment can absorb the bits without its fullness exceeding 100% or below 0%. Any bits that cannot be added to the segment are retained in the counter. Through this mechanism, overflow and underflow is distributed between frame types within a GOP 106 to the extent possible.

In addition to adjusting the segment fullness, the encoding manager 101 can calculate a normalized average of over/underused bits of the last n (where n is a design parameter, e.g., three) frames 113 of the type to be encoded, which can subsequently be used to normalize the buffer 105 fullness, as explained shortly. For example, the normalized average can be calculated for I and P frames 113 with the formula:

$$NA=(DX[0]+DX[1]+DX[2])/(8000000*0.65)$$

and for B frames with the formula:

$$NA=(DX[0]+DX[1]+DX[2])/(8000000*0.35)$$

where NA equals the normalized average of over/underused bits, n equals three and DX[n] equals the number of over/underused bits for the last n frames 113 of type X. Of course, the constants in the formulas above are design parameters.

The encoding manager 101 can next calculate a normalized segment fullness for the segment corresponding to the frame 113 type to be encoded, and a delta quant value. The delta quant value is an intermediate variable used in the embodiment being described to determine the quant 115 to use to encode the frame 113. The normalized segment 105 fullness is also used for this purpose. These values can be calculated as shown in the following block of pseudo code:

```
NSFX = SFX - 0.2 * Size X
if (NSFX > 0)
{
    NSFX = 5 * (SFX - 0.2 * Size X) / (4 * Size X)
    delta quant = 31* B^5 + 256 * NAX^3
}
else if (NSFX < 0)
{
    NSFX = 5 * (SFX - 0.2 * Size X) / Size X
    delta quant = 31 * B^3 + 256 * NAX^3
}
```

Wherein NSFX equals the normalized segment fullness for the segment for frame type X, SFX equals the non-normalized fullness for the same segment, Size X equals the size of the segment in question and NAX equals the normalized average of over/underused bits of the last n frames 113 of the type to be encoded. The constants in the pseudo code are of course design parameters.

In some embodiments, the absolute value of delta quant must be less than the base quant envelope for the frame type being encoded, and is adjusted accordingly if it is not calculated to be thus. The quant 115 to use to encode the frame 113 is then calculated by adding delta quant to the base quant envelope for the frame type.

As explained above, this particular methodology is simply one low level example of calculating a quant 115 to use to encode a frame 113 as a function of the fullness of the buffer 105. Other implementations and variations will be apparent to those of ordinary skill in the relevant art in light of this specification, and are within the scope of the present invention.

In some embodiments, the encoding manager adjusts the quant 115 to account for a transition frame 113 in the video sequence 103 (e.g., a frame 113 that comprises a scene change, a fade, etc.). The implementation mechanics of detecting transitions in a video sequence 103 are known to those of ordinary skill in the relevant art. In some embodiments, the encoding manager 101 uses detected transitions to identify transition frames 113 and the adjust the quant 115 accordingly, for example according to a formula that affects how aggressively such frames 113 are encoded. The specific formula(s) to use are a design choice, and can vary from transition type to transition type if desired. For example, the quant 115 to use to encode a frame 113 comprising a fade can be multiplied by a fade constant, whereas the quant 115 used to encode a frame 113 comprising a scene change can be multiplied by a scene change constant. In some embodiments, a quant 115 used to encode any transition frame 113 can be multiplied by a single transition constant. Other methods can be used to affect the encoding of transition frames 113, the implementation mechanics of which will be apparent to those of ordinary skill in the relevant art in light of this specification.

Once the encoding manager 101 has determined 207 the quant 115, the encoding manager 101 encodes 209 the frame 113 with the quant 115. The encoding is performed according to standard techniques, typically at a macro block level as per the MPEG2 standard. The implementation mechanics for such encoding are known to those of ordinary skill in the relevant art, and are also described in detail in the Multi-pass Application.

After the frame 113 has been encoded 209, in some embodiments the encoding manager 101 determines 211 whether the encoding is VBV compliant, as per the MPEG2 standard. The MPEG2 standard dictates that the encoding of each frame not cause a VBV buffer underflow. Thus, in some embodiments, if the encoding manager 101 has determined 211 that the current encoding does cause a VBV buffer underflow, the encoding manager 101 adjusts the quant 115 used to encode the current frame 113 accordingly as a corrective measure, repeating steps 207 through 211 until the encoded frame 113 is VBV compliant.

After determining 211 that an encoded frame 113 is VBV compliant, the encoding manager 101 determines whether the encoded frame 113 was the last frame 113 of the sequence 103. If so, the encoding of the sequence 103 is complete. Otherwise, the encoding manager 101 updates 213 frame encoding parameters based on the encoded frame 113. This involves at least updating the buffer 105 fullness based on any over or underused bits for the encoded frame 113. More specifically, overused or underused bits are calculated by subtracting the allocated bits from the actual used bits for the currently encoded frame, and are added to the buffer segment of the corresponding frame type. If that buffer segment is overflowed (fullness exceeding 100%) or underflowed (fullness below 0%), the overflow or underflow bits are temporarily stored in a counter. The contents of the counter is later added to the appropriate buffer 105 segment during quant 115 calculation, as explained above.

Additionally, the encoding manager 101 can update 213 other frame parameters, such as the complexity parameter for the encoded frame type, for example by updating the modified TM5 model:

$$X_{frame\ type}=(Total\ Bits-Overhead\ Bits)*quant$$

wherein $X_{frame\ type}$ equals the complexity of the encoded frame 113. Because the encoding manager 101 has just encoded 209 the frame 113, the encoding manager knows the quant 115 used as well as the number of bits and overhead bits, and thus can calculate an updated complexity parameter.

The encoding manager 101 can also calculate a current average quant 115 used to encode frames 113 of the frame 113 type, and utilize the average quant 115 values to update ratio information concerning frame types, KP and KB, for example according to the formula:

$$KP = 0.125*(7*KP + \text{average quant for } P \text{ frames/average quant for } I \text{ frames})$$

$$KB = 0.125*(7*KB + \text{average quant for } B \text{ frames/average quant for } I \text{ frames})$$

wherein the constants are design parameters, and the values of KP and KB are typically bounded by minimum and maximum values.

In some embodiments the stored history concerning the last n encoded frames 113 of each type is updated to reflect the encoding of the frame 113. Additionally, the encoding manager 101 can update the base quant envelope for the frame type, for example according to the formula:

$$X \text{ Envelope} = X \text{ Envelope} + \text{Envelope Control } X * \text{delta quant}$$

wherein X Envelope is the base quant envelope for frame type X, Envelope Control X is the associated control parameter discussed above, and delta quant is the value calculated during the determination of the quant 115 to use to encode 209 the frame 113, as discussed above.

After updating 213 the frame parameters, the encoding manager 101 determines whether it is at the end of the GOP 106 being encoded. If not, it proceeds to process the next frame 113 in the GOP 106 by executing steps 205-213, as described above. However, if the encoding manager is at a GOP boundary, it updates 215 GOP parameters. Specifically, the encoding manager 101 redistributes any over/underused bits between the segments of the buffer 105 as a function of the total number of over/underused bits in the buffer 105, and the number of I frames, P frames and B frames per GOP, for example according to the formulas:

Total Bits in Buffer=Bits in $I$ Segment+Bits in $P$ Segment+Bits in $B$ Segment Bits in $I$ Segment=3*Total Bits in Buffer/($NF$*0.8)

Bits in $P$ Segment=3*Total Bits in Buffer*$NP$/($NF$*0.8)

Bits in $B$ Segment=Total Bits in Buffer*$NB$/($NF$*0.8)

Additionally, the encoding manager 101 can determine the number of bits to carryover to the next GOP 106 by subtracting the number of bits in the GOP from the GOP bit target calculated during the GOP initialization.

As will be understood by those familiar with the art, the invention may be embodied in other specific forms without departing from the spirit or essential characteristics thereof. Likewise, the particular naming and division of the modules, features, attributes, methodologies, managers and other aspects are not mandatory or significant, and the mechanisms that implement the invention or its features may have different names, divisions and/or formats. Furthermore, as will be apparent to one of ordinary skill in the relevant art, the modules, features, attributes, methodologies, managers and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming.

Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

What is claimed is:

1. A computer-implemented method for robust single-pass variable bit rate video encoding of a video sequence, the method comprising:
    determining a buffer size for keeping track of over/underused bits generated during the encoding of the video sequence, the buffer size being a function of at least a target bit rate for the video sequence and a length of the video sequence;
    initializing the buffer to a default initial fullness;
    for each frame of the video sequence, performing the following steps:
        allocating a number of bits to the frame;
        determining a quant with which to encode the frame, the quant being a function of at least the buffer's fullness, a base quant envelope and a base quant envelope control associated with the frame, wherein the base quant envelope and the base quant envelope control are based on the type of the frame, and the fluctuation of the base quant envelope is controlled by the base quant envelope control;
        encoding the frame according to the determined quant;
        calculating a normalized average of over/underused bits of the last N encoded frames of a frame type in a group of pictures, wherein N is a predetermined threshold number; and
        updating the base quant envelope for the frame type based on the normalized average of over/underused bits of the encoded frames of the frame type.

2. The method of claim 1 further comprising:
    after encoding all frames of the GOP, redistributing over/underused bits between the segments of the buffer as a function of at least a total number of over/underused bits in the buffer and the number of I frames, P frames and B frames the GOP and storing an indication of a number of over/underused bits with respect to the allocated target bits for the GOP to carry over to the next GOP.

3. The method of claim 1, wherein calculating a normalized average of over/underused bits of the last N encoded frames further comprises:
    calculating the normalized average of over/underused bits of the last N encoded I or P frames using a first threshold value; and
calculating the normalized average of over/underused bits of the last N encoded B frames using a second threshold value.

4. The method of claim 3, wherein the first threshold value is 0.65 and the second threshold value is 0.35.

5. The method of claim 1, wherein allocating a number of bits to a frame comprises:
    allocating bits to the frame according to a modified TM5 reference model, the allocation utilizing at least one an additional parameter from a group of parameters consisting of:
        at least one frame complexity parameter for a last encoded frame of a frame type;
        a GOP bit target for the GOP being processed;
        ratio information concerning frame types within a GOP;
        the number of I frames per GOP;
        the number of P frames per GOP; and
        the number of B frames per GOP.

6. A computer system for robust single-pass variable bit rate video encoding of a video sequence, the system comprising:
- a buffer configured to store a plurality of video frames; and
- an encoding manager, coupled to the buffer, configured to:
  - determine the size of the buffer for keeping track of over/underused bits generated during the encoding of the video sequence, the buffer size being a function of at least a target bit rate for the video sequence and a length of the video sequence;
  - initialize the buffer to a default initial fullness;
  - for each frame of the video sequence, the encoding buffer configured to perform the following steps:
    - allocate a number of bits to the frame;
    - determine a quant with which to encode the frame, the quant being a function of at least the buffer's fullness, a base quant envelope and a base quant envelope control associated with the frame, wherein the base quant envelope and the base quant envelope control are based on the type of the frame, and the fluctuation of the base quant envelope is controlled by the base quant envelope control;
    - encode the frame according to the determined quant;
    - calculate a normalized average of over/underused bits of the last N encoded frames of a frame type in a group of pictures, wherein N is a predetermined threshold number; and
    - update the base quant envelope for the frame type based on the normalized average of over/underused bits of the encoded frames of the frame type.

7. The system of claim 6, wherein the encoding buffer is further configured to:
- after encoding all frames of the GOP, redistribute over/underused bits between the segments of the buffer as a function of at least a total number of over/underused bits in the buffer and the number of I frames, P frames and B frames the GOP and storing an indication of a number of over/underused bits with respect to the allocated target bits for the GOP to carry over to the next GOP.

8. The system of claim 6, wherein the encoding manager is further configured to:
- calculate the normalized average of over/underused bits of the last N encoded I or P frames using a first threshold value; and
- calculate the normalized average of over/underused bits of the last N encoded B frames using a second threshold value.

9. The system of claim 6, wherein the encoding manager is further configured to:
- allocate bits to the frame according to a modified TM5 reference model, the allocation utilizing at least one an additional parameter from a group of parameters consisting of:
  - at least one frame complexity parameter for a last encoded frame of a frame type;
  - a GOP bit target for the GOP being processed;
  - ratio information concerning frame types within a GOP;
  - the number of I frames per GOP;
  - the number of P frames per GOP; and
  - the number of B frames per GOP.

10. A non-transitory computer-readable medium having program instructions, which when executed by a processor perform a method for single-pass variable bit rate video encoding, the method comprising:
- determining a buffer size for keeping track of over/underused bits generated during the encoding of the video sequence, the buffer size being a function of at least a target bit rate for the video sequence and a length of the video sequence;
- initializing the buffer to a default initial fullness;
- for each frame of the video sequence, performing the following steps:
  - allocating a number of bits to the frame;
  - determining a quant with which to encode the frame, the quant being a function of at least the buffer's fullness, a base quant envelope and a base quant envelope control associated with the frame, wherein the base quant envelope and the base quant envelope control are based on the type of the frame, and the fluctuation of the base quant envelope is controlled by the base quant envelope control;
  - encoding the frame according to the determined quant;
  - calculating a normalized average of over/underused bits of the last N encoded frames of a frame type in a group of pictures, wherein N is a predetermined threshold number; and
  - updating the base quant envelope for the frame type based on the normalized average of over/underused bits of the encoded frames of the frame type.

11. A computer-implemented method for robust single-pass variable bit rate video encoding of a video sequence, wherein the video sequence contains multiple groups of pictures, the method comprising:
- determining a buffer size for keeping track of over/underused bits generated during the encoding of the video sequence, the buffer size being a function of at least a target bit rate for the video sequence and a length of the video sequence;
- initializing the buffer to a default initial fullness;
- calculating a normalization factor for each group of pictures (GOP), wherein the normalization factor representing a ratio between the frame types within the GOP;
- allocating, based on the normalization factors of the GOPs, a segment of the buffer for keeping track of over/underused bits for I frames, a segment for keeping track of over/underused bits for P frames and a segment for keeping track of over/underused bits for B frames;
- calculating a normalized segment fullness for the segment corresponding to the frame type to be encoded;
- determining a delta quantization value based on the normalized segment fullness for the segment;
- updating base quant using the delta quantization value, wherein the base quant is a function of at least the segment fullness, a base quant envelope and a base quant envelope control associated with the frame type to be encoded; and
- encoding the frames of the segment according to the updated base quant.

12. The method of claim 11 further comprising:
- before encoding any frame, initializing to a default initial value at least one parameter from a group of parameters consisting of:
  - a base quant envelope for each frame type;
  - a base quant envelope control for each frame type;
  - ratio information concerning frame types; and
  - a frame complexity parameter for each frame type.

13. The method of claim 11 further comprising:
- for each GOP of the video sequence, before encoding any frame of that GOP, determining whether the fullness of each segment of the buffer is at least at an associated minimal value; and responsive to the fullness of a segment of the buffer not being at least at the associated minimal value, adjusting the fullness of the segment accordingly.

14. The method of claim 11 further comprising calculating the normalized segment fullness for the segment corresponding to the frame type to be encoded based on at least the segment size.

15. The method of claim 11 further comprising:
adding a counter of unallocated over/underflow bits to the buffer segment corresponding to the type of frame to be encoded, to an extent that the buffer segment is not overflowed or underflowed; and
retaining any over/underflow bits that cannot be added to the segment in the counter.

16. A non-transitory computer-readable medium having program instructions, which when executed by a processor perform a method for single-pass variable bit rate video encoding, the method comprising:
determining a buffer size for keeping track of over/underused bits generated during the encoding of the video sequence, the buffer size being a function of at least a target bit rate for the video sequence and a length of the video sequence;
initializing the buffer to a default initial fullness;
calculating a normalization factor for each group of pictures (GOP), wherein the normalization factor representing a ratio between the frame types within the GOP;
allocating, based on the normalization factors of the GOPs, a segment of the buffer for keeping track of over/underused bits for I frames, a segment for keeping track of over/underused bits for P frames and a segment for keeping track of over/underused bits for B frames;
calculating a normalized segment fullness for the segment corresponding to the frame type to be encoded;
determining a delta quantization value based on the normalized segment fullness for the segment;
updating base quant using the delta quantization value, wherein the base quant is a function of at least the segment fullness, a base quant envelope and a base quant envelope control associated with the frame type to be encoded; and
encoding the frames of the segment according to the updated base quant.

17. The non-transitory computer-readable medium of claim 16, the method further comprising:
before encoding any frame, initializing to a default initial value at least one parameter from a group of parameters consisting of:
a base quant envelope for each frame type;
a base quant envelope control for each frame type;
ratio information concerning frame types; and
a frame complexity parameter for each frame type.

18. The non-transitory computer-readable medium of claim 16, the method further comprising:
for each GOP of the video sequence, before encoding any frame of that GOP, determining whether the fullness of each segment of the buffer is at least at an associated minimal value; and responsive to the fullness of a segment of the buffer not being at least at the associated minimal value, adjusting the fullness of the segment accordingly.

19. The non-transitory computer-readable medium of claim 16, the method further comprising calculating the normalized segment fullness for the segment corresponding to the frame type to be encoded based on at least the segment size.

20. The non-transitory computer-readable medium claim 16, the method further comprising:
adding a counter of unallocated over/underflow bits to the buffer segment corresponding to the type of frame to be encoded, to an extent that the buffer segment is not overflowed or underflowed; and
retaining any over/underflow bits that cannot be added to the segment in the counter.

21. A computer-implemented method for single-pass variable bit rate video encoding, the method comprising:
providing at least one buffer for tracking over/underused bits generated during the encoding of a video sequence; and
for each frame of the video sequence:
allocating a number of bits to the frame;
determining an encoding parameter as a function of at least a fullness of the buffer and a type of the frame being encoded;
encoding the frame as a function of the encoding parameter; and
updating the encoding parameter based on a normalized average of over/underused bits of encoded frames of the frame type.

22. The method of claim 21, wherein the encoding parameter is a quantizer value.

23. A non-transitory computer-readable medium having program instructions, which when executed by a processor perform a method for single-pass variable bit rate video encoding, the method comprising:
providing at least one buffer for tracking over/underused bits generated during the encoding of a video sequence; and
for each frame of the video sequence:
allocating a number of bits to the frame;
determining an encoding parameter as a function of at least a fullness of the buffer and a type of the frame being encoded;
encoding the frame as a function of the encoding parameter; and
updating the encoding parameter based on a normalized average of over/underused bits of encoded frames of the frame type.

24. The non-transitory computer-readable medium of claim 23, wherein the encoding parameter is a quantizer value.

* * * * *